July 15, 1969   J. D. CUMMING   3,455,200
FRICTION GRIP WEDGE FASTENERS
Filed Oct. 2, 1967   3 Sheets-Sheet 1
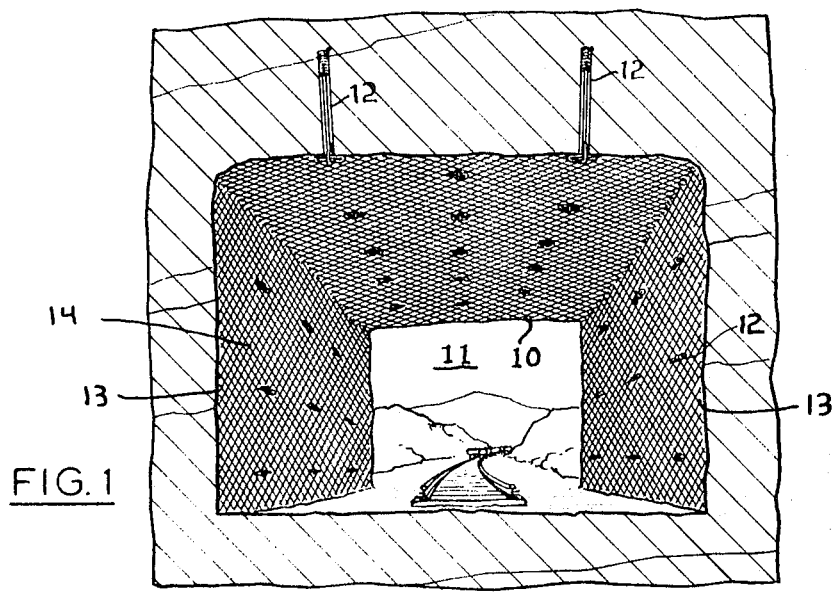
FIG.1
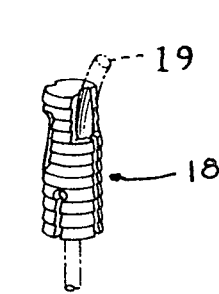
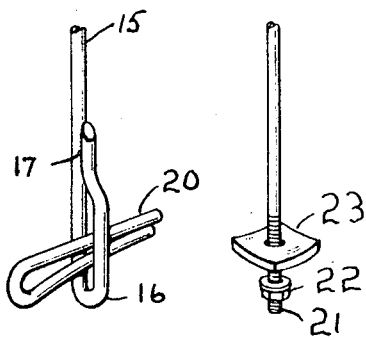
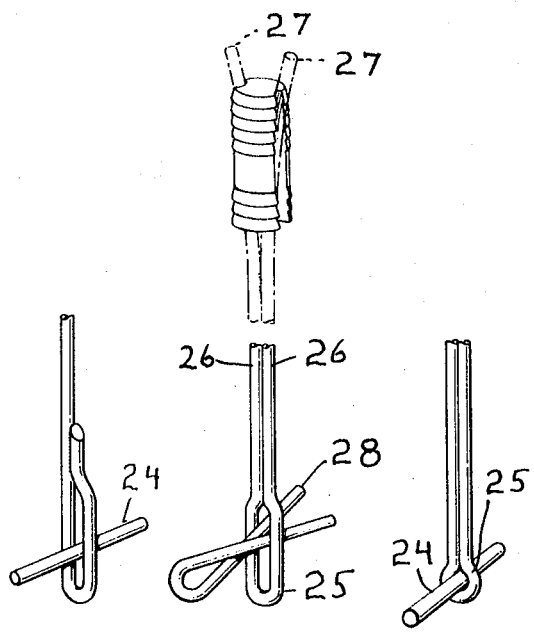
FIG.2   FIG.3   FIG.4   FIG.5   FIG.6
JAMES D. CUMMING
INVENTOR.
BY Maybee & Legris
ATTORNEYS

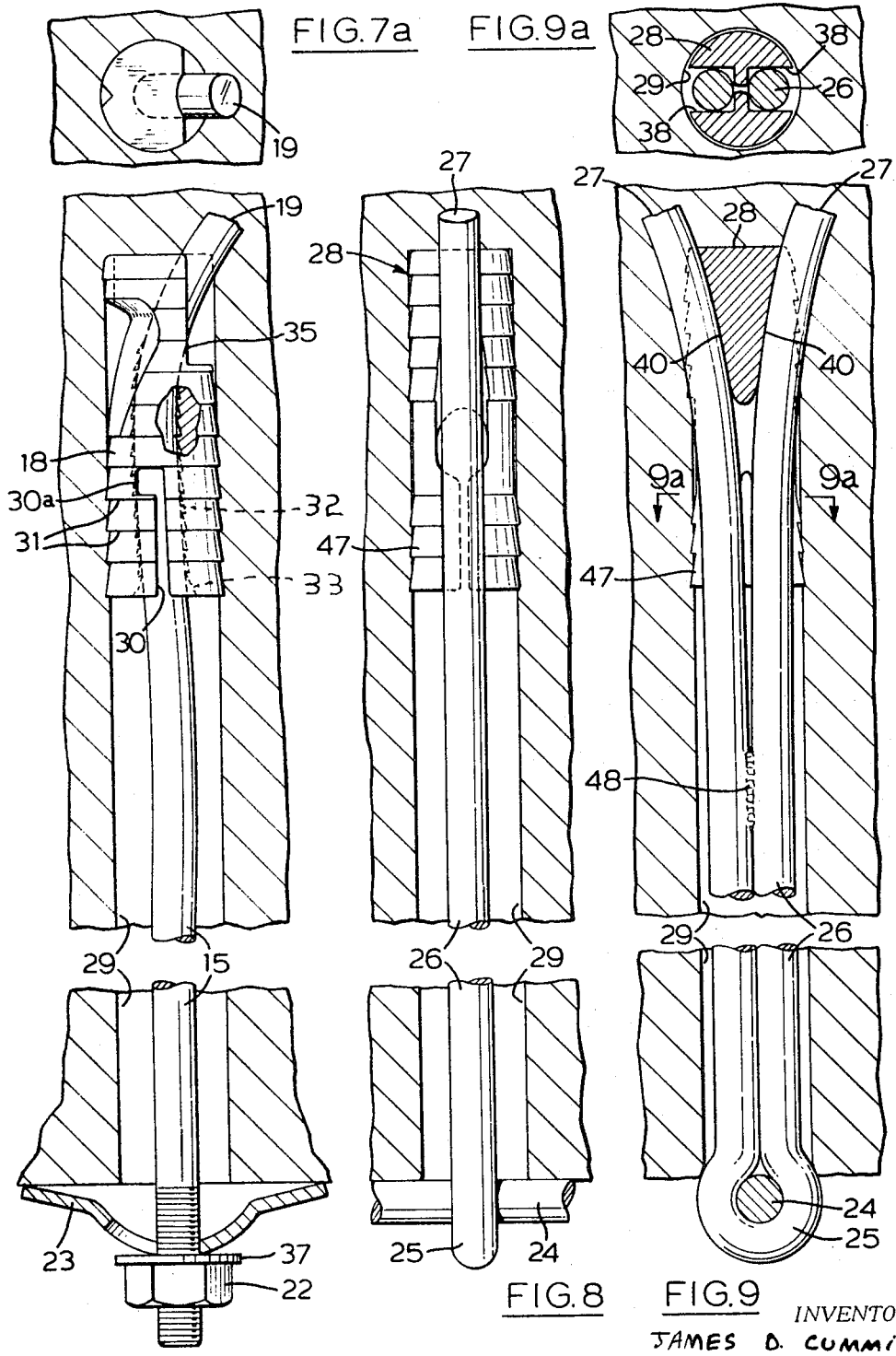

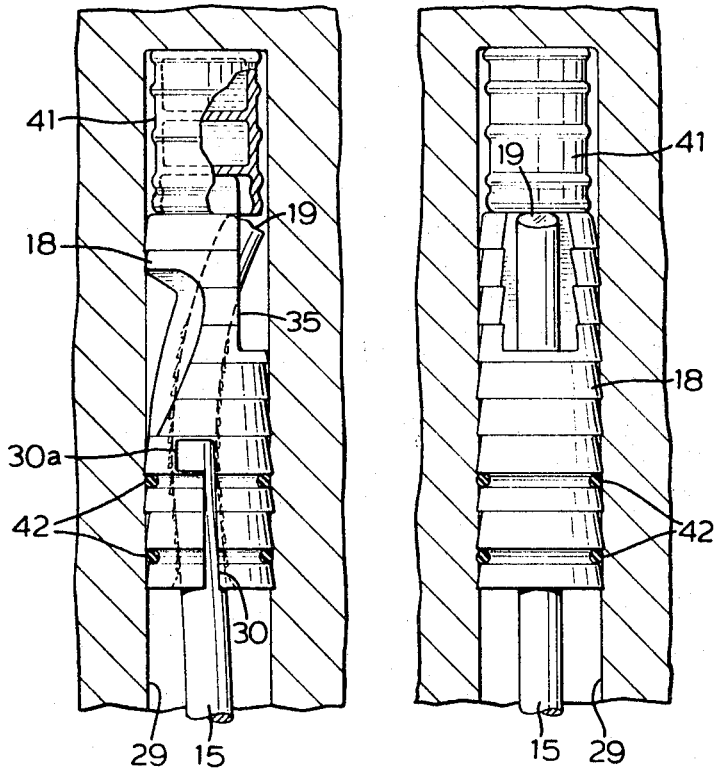

United States Patent Office 3,455,200
Patented July 15, 1969

3,455,200
FRICTION GRIP WEDGE FASTENERS
James Deans Cumming, Havelock, Ontario, Canada
Filed Oct. 2, 1967, Ser. No. 672,148
Claims priority, application Great Britain, Oct. 3, 1966,
44,130/66
Int. Cl. F16b 13/10, 33/04
U.S. Cl. 85—66      3 Claims

ABSTRACT OF THE DISCLOSURE

This invention relates to friction grip fasteners of the general kind including a pin, bar or bolt, herein referred to as a pin, having an end which is adapted to engage frictionally a plug or expansion shell. The invention is especially applicable to various types of fasteners used in mining installations, such as rock bolts and anchoring devices.

---

A friction grip fastener according to the invention comprises a plug or expansion shell providing two bore lengths through which a pin may pass, the bore lengths being inclined to one another and so positioned that when the pin is inserted and driven through the one bore length it is received by the second bore length, the end of the pin being deflected so that the pin is deformed and held frictionally by and in relation to the plug or expansion shell.

As applied to a rock bolt, anchoring device, or like fastener for providing an anchorage at a blind hole, the expansion shell of the invention would be an elongated plug or body adapted to be inserted into the blind hole and having an expansible shank adapted to be expanded into frictional engagemente with the sides of the hole, the plug or body having a through-bore comprising a first longitudinally extending part constituting the first bore and a second part inclined to the first part and constituting the second bore length. The pin itself may comprise a single shank which is driven through the bore so that its end is deflected into engagement with the wall of the blind hole, or alternatively it may comprise twin shanks formed by bending a bar of malleable iron or steel into a hearpin form. In the latter case, the throughbore may be bifurcated or may consist of twin channels or passageways adapted to receive and defleet thc ends of the shanks outwardly.

In order to provide a secure anchorage at the closed end of the blind hole, particularly when the fastener is used in soft or crumbly rock formations, a frangible capsule containing an epoxy resin and hardener may be used in conjuction with the fastener. The capsule may be mounted at one end of the sleeve body and have a tear strip or the like which is engaged by the end of the pin as the latter emerges from the through-bore.

Practical embodiments of the invention will now be described by way of example with reference to the accompanying drawings, in which:

FIGURE 1 is a perspective view of a portion of a mine tunnel showing representative rock bolts in position to support the roof and to support a wire mesh lining for the tunnel wall;

FIGURES 2 to 6 are perspective views of various rock bolts in accordance with the invention;

FIGURE 7 is an enlarged view showing in sectional elevation the rock bolt of FIGURE 3 secured in position;

FIGURE 7A is an end view of the rock bolt of FIGURE 7;

FIGURE 8 is an enlarged view showing in sectional elevation the rock bolt of FIGURE 6 secured in position;

FIGURE 9 is a longitudinal sectional taken at right angles to the section shown in FIGURE 8;

FIGURE 9A is a section on line 9A—9A in FIGURE 9;

FIGURES 10 and 10A show a detail of a modification of the invention.

Referring now to FIGURE 1, it will be seen that the roof 10 of a mine tunnel 11 may be supported by a plurality of rock bolts generally bearing the reference character 12. The walls 13 of the tunnel and the roof 10 are linked by a wire mesh screen 14, which is secured in place by the rock bolts 12. Various rock bolts for this purpose are shown in FIGURES 2 to 6.

The rock bolt of FIGURE 2 comprises a bar of malleable iron having a main shank 15 and an outer end portion 16 which is looped back on itself and which may be welded to the main shank at 17. The rock bolt is used in conjunction with an expansion plug or body 18, the construction of which will be described below, which plug or body has a throughbore consisting of a first longitudinally extending part and a second part which is inclined to the first part. The plug 18 is adapted to be inserted into a blind hole drilled in the wall or roof of the tunnel 11, and the end 19 of the rock bolt is inserted and driven through the bore in the plug. When the rock bolt is driven home, the end 19 engages with the second inclined part of the bore and is deflected, thus deforming the shank 15 so that it is urged into frictional engagement with both the bore parts. At the same time a slotted end of the plug 18 is expanded into frictional engagement with the sides of the blind hole. A cross pin 20, which is adapted to bear against the wire mesh screen, or against the rock face if no such screen is provided, is inserted through the loop at the outer end of the rock bolt. The cross pin 20 is itself of looped formation so as to form a wedge, as shown in FIGURE 2, so as to accommodate variations in the length of the blind hole, the distance through which the cross pin is inserted, or variations in rock hardness, when the cross pin is hammered home. The cross pin is resilient and maintains the shank 15 under tension.

The rock bolt shown in FIGURE 3 differs from that of FIGURE 2 only in the form of its outer end, which is threaded at 21 to receive a nut 22. In this example the cross pin 20 of FIGURE 2 is replaced by a washer 23, which bears against the rock face and is tensioned by tightening of the nut 22.

The rock bolt shown in FIGURE 4 is essentially the same as that of FIGURE 2, the only difference being that the looped or wedge-shaped cross pin 20 is replaced by a simple cross pin 24.

FIGURE 5 shows a rock bolt formed by bending a bar of malleable iron to provide a loop 25 at its outer end and twin shanks 26 terminating at inner ends 27. The cross pin 28 is also of a modified design which is inserted and rotated to provide an increased bearing surface.

FIGURE 6 shows a rock bolt which is similar to that shown in FIGURE 5, but in which the loop 25 is modified to receive a simplified cross pin 24 of the type shown in FIGURE 4.

FIGURE 7 shows the rock bolt of FIGURE 3 secured in a blind hole 29 drilled in the wall of the mine tunnel. The plug or expansion shell 18 is in the form of a sleeve having a pair of short axially extending diametrically opposed, slots 30, which terminate at enlarged openings 30a, and an outer surface which is serrated to provide a series of annular edges 31 which bite into the sides of the hole 29 to secure the plug frictionally within the hole when the plug is expanded. The through-bore of the plug 18 comprises a first longitudinal part 32 having an entrance formed with a conical lead in surface 33, and a second inclined part 34 which is offset from the axis of the plug and terminates in an opening 35 at one side.

When the shank 15 of a rock bolt is inserted through the opening 33 and the rock bolt is driven home, the end 19 of the bolt is deflected by engagement with the second bore part 34, and bites into the rock surface as shown in FIGURE 7. The deformation of the shank 15 causes the shank to engage frictionally with the two parts 32 and 34 of the bore aided by the internal serrations formed therein. At the same time the plug is expanded by the reaction of the bolt against one side of the sleeve, which is deflected into engagement with the wall of the blind hole so as to bite into the latter, such deflection being permitted by the slots 30. When the bolt is securely driven home, the washer 23 is placed on its end and the nut 22 is threaded onto the threaded end of the shank 15, with the interposition of a washer 37, to tighten the washer 23 and tension the bolt to reduce weight, the plug 18 may be relieved at 18a as shown in FIGURE 7.

Referring now to FIGURES 8 and 9 the plug 28 to be used with a rock bolt having a twin shank 26 has a split shank portion 47 which is adapted to be expanded into gripping engagement with the wall of a blind hole 29. The outer surface of the plug is serrated to provide a series of annular or part annular teeth as in the preceding example. Instead of having a single through-bore the plug is formed with a pair of twin passageways 38 each having a first part 39 adapted to receive the ends 27 of the twin shanks, the shanks being welded together at 48, and a second part 40 which is inclined to the first part and deflects the ends of the twin shanks away from the axis of the plug when the rock bolt is driven home.

FIGURES 10 and 10A show a detail of a fastener which is to be used with soft or crumbly rock. The fastener is of the kind shown in FIGURE 7, but a capsule 41 having isolated compartments containing, respectively, an epoxy resin and a hardener or accelerator in the required proportions, is fitted on the end of the plug 18. Both compartments of the capsule are adapted to be broken by the end 19 of the bolt, when the latter emerges from the opening 35, and conveniently the end of the bolt may engage a tear strip (not shown) to release the resin and hardener when the rock bolt is driven home. Alternatively, the capsule may be of such construction that it will shatter easily to release its contents when the rock bolt is hammered home. O-rings 42 may be provided at one end of the plug 18 to provide a seal between the plug and the wall of the blind hole so as to prevent the liquid contents from escaping from the hole before setting.

What I claim as my invention is:

1. A friction grip fastener adapted to frictionally secure a pin in a blind hole comprising sleeve means having two bore lengths therein, both bore lengths having serrated internal surfaces, one bore length being inclined to the other, the two bore lengths being adapted to receive a pin driven therethrough when the sleeve means is seated at the blind end of a blind hole, so as to deform the pin over that portion of its length lying within the two bore lengths thereby frictionally engaging the pin with the internal serrated surfaces of said two bore lengths, said sleeve means being split longitudinally along at least part of the length of one bore length generally parallel to the axis of that bore length, the forces generated by the deformation of the pin reacting against the walls of the sleeve, including that portion having the bore length embodying the longitudinal split expanding the walls of the sleeve into frictional engagement with the sides of the blind hole, the external surfaces of the sleeve means being serrated to increase the frictional engagement between the sleeve and the walls of the blind hole.

2. A friction grip fastener as claimed in claim 1 wherein the sleeve means is split longitudinally along at least part of the length of one bore length at two diametrically opposed locations, each split extending from the free end of the sleeve means and terminating in an enlarged aperture substantially midway between the ends of the sleeve means.

3. A friction grip fastener as claimed in claim 2 wherein the sleeve means is additionally split longitudinally along the combined length of both bore lengths at a circumferential position intermediate the position of the two diametrically opposed splits.

References Cited

UNITED STATES PATENTS

| | | | |
|---|---|---|---|
| 774,144 | 11/1904 | Anderson | 85—23 |
| 1,010,875 | 12/1911 | Deppen | 285—425 |
| 1,095,052 | 4/1914 | Wechsler | 85—26 |
| 1,519,502 | 12/1924 | Nalle | 85—23 |
| 1,924,657 | 8/1933 | Saine et al. | 285—363 |
| 3,298,144 | 1/1967 | Fischer | 61—45 |

FOREIGN PATENTS

| | | |
|---|---|---|
| 477,801 | 10/1951 | Canada. |
| 736,058 | 9/1932 | France. |
| 59,266 | 10/1891 | Germany. |
| 75,727 | 5/1892 | Germany. |
| 159,010 | 2/1921 | Great Britain. |
| 212,263 | 3/1924 | Great Britain. |

MARION PARSONS, Jr., Primary Examiner

U.S. Cl. X.R.

85—26, 79